United States Patent
Miyake et al.

(10) Patent No.: US 7,914,066 B2
(45) Date of Patent: Mar. 29, 2011

(54) REAR DOOR STRUCTURE

(75) Inventors: Yoshinori Miyake, Haga-gun (JP); Kenichi Munenaga, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/582,213

(22) Filed: Oct. 20, 2009

(65) Prior Publication Data

US 2010/0102589 A1 Apr. 29, 2010

(30) Foreign Application Priority Data

Oct. 23, 2008 (JP) ................................. 2008-273163

(51) Int. Cl.
*B60J 5/00* (2006.01)

(52) U.S. Cl. ........ 296/146.6; 49/501; 296/56; 296/146.8

(58) Field of Classification Search .................... 49/501; 296/50, 56, 146.1, 146.5, 146.6, 146.8
See application file for complete search history.

(56) References Cited

U.S. PATENT DOCUMENTS

| | | | |
|---|---|---|---|
| 4,991,252 A | 2/1991 | Budinski | |
| 6,053,562 A * | 4/2000 | Bednarski | 296/146.5 |
| 6,123,384 A * | 9/2000 | Eustache et al. | 296/146.2 |
| 6,637,801 B1 * | 10/2003 | Eustache et al. | 296/106 |
| 6,659,538 B2 * | 12/2003 | Scheid | 296/146.8 |
| 6,776,449 B2 * | 8/2004 | Komatsu et al. | 296/146.5 |
| 7,011,357 B2 * | 3/2006 | Seksaria et al. | 296/146.2 |
| 7,029,057 B2 * | 4/2006 | Izabel et al. | 296/152 |
| 7,144,065 B2 * | 12/2006 | McClure et al. | 296/146.8 |
| 7,246,840 B2 * | 7/2007 | Gates et al. | 296/106 |
| 7,306,279 B2 * | 12/2007 | Saitoh | 296/146.8 |
| 7,387,321 B2 * | 6/2008 | Tanaka et al. | 292/336.3 |
| 7,537,267 B2 * | 5/2009 | Tanaka et al. | 296/146.6 |
| 7,618,083 B2 * | 11/2009 | Munenaga et al. | 296/146.6 |
| 7,681,940 B2 * | 3/2010 | Brown et al. | 296/146.8 |
| 2001/0005084 A1 * | 6/2001 | Ponziani | 296/56 |
| 2006/0022486 A1 * | 2/2006 | Kalmbach et al. | 296/146.8 |
| 2006/0191206 A1 * | 8/2006 | Mooney et al. | 49/502 |
| 2007/0210613 A1 * | 9/2007 | Tanaka et al. | 296/146.6 |
| 2008/0030047 A1 * | 2/2008 | Munenaga et al. | 296/146.6 |

FOREIGN PATENT DOCUMENTS

| | | |
|---|---|---|
| EP | 1 803 597 A1 | 7/2007 |
| JP | 62-061861 | 3/1987 |
| JP | 2004-330963 | 11/2004 |
| JP | 2007-237947 | 9/2007 |
| JP | 2008-37164 | 2/2008 |

* cited by examiner

*Primary Examiner* — Jerry Redman
(74) *Attorney, Agent, or Firm* — Rankin, Hill & Clark LLP

(57) ABSTRACT

A rear door structure including: a frame portion which supports an upper edge and both lateral edges of a rear glass; a lateral beam which extends in a vehicle width direction and connects both lateral side portions of the frame portion to each other; a reinforcing member which straddles the lateral side portion of the frame portion and the lateral beam; and a driving unit for a wiper device disposed in a space between the lateral side portion of the frame portion and the lateral beam, wherein: a first end side of the driving unit is fixed to a connection portion between the frame portion and the reinforcing member; and a second end side of the driving unit is fixed to a connection portion of between the reinforcing member and the lateral beam.

5 Claims, 7 Drawing Sheets

REAR DOOR STRUCTURE

Priority is claimed on Japanese Patent Application No. 2008-273163, filed Oct. 23, 2008, the contents of which are incorporated herein by reference.

BACKGROUND OF THE INVENTION

1. Field of the Invention

The present invention relates to a structure of a rear door openably and closably provided at a rear opening portion of a vehicle.

2. Description of the Related Art

In hatchback type vehicles or the like, an opening portion is provided at a rear portion of a vehicle body, at which a rear door is openably and closably provided. The rear door is generally provided with a frame portion to which a rear glass is attached. In addition, the center portion of the lower hem of the frame portion is provided with a wiper device that wipes the surface of the rear glass.

Since a wiper blade of the wiper device is driven by a motor to be controlled to rotate to the left and the right, a large reaction force acts on the driving unit that controls the wiper blade. In addition, due to the heavy weight of the wiper device, the inertia load acts on a portion where the wiper device is attached, when opening and closing the rear door. In view of the issues above, a structure with high rigidity for supporting the driving unit is proposed (for example, refer to Japanese Unexamined Patent Application, First Publication No. 2007-237947).

In the rear door structure described in the patent document above, there is provided a lateral beam having a closed cross section, which connects both lateral side portions of the frame portion. A driving unit of a wiper device is attached so as to straddle substantially a center portion of the lateral beam in a vehicle width direction and a door panel.

The conventional rear door structure described above can be employed in a vehicle having a sufficient space for installation of a wiper device at substantially a center portion in the vehicle width direction. However, in a vehicle in which a wiper device is disposed at the lower edge of the lateral portion of the rear glass from the perspective of securing rearward visibility, it is hard to secure a space for installation of such a driving unit.

In view of the above-described circumstances, the present invention has an object of providing a rear door structure which can install a driving unit of a wiper device in a lower end region of a lateral portion of a rear glass with high space efficiency and high rigidity.

SUMMARY OF THE INVENTION

In order to achieve the object described above, the present invention employs the following. In particular, the present invention employs a rear door structure in which a rear door is openably and closably provided on a rear portion of a vehicle body, the rear door structure including a frame portion which supports an upper edge and both lateral edges of a rear glass; a lateral beam which extends in a vehicle width direction and connects both lateral side portions of the frame portion to each other; a reinforcing member which straddles the lateral side portion of the frame portion and the lateral beam; and a driving unit for a wiper device which is disposed in a space between the lateral side portion of the frame portion and the lateral beam to wipes a surface of the rear glass, wherein: a first end side of the driving unit is fixed to a connection portion between the frame portion and the reinforcing member; and a second end side of the driving unit is fixed to a connection portion of between the reinforcing member and the lateral beam.

In this structure, the driving unit of the wiper device is fixed so as to straddle: the connection portion between the frame portion and the reinforcing member; and the connection portion between the reinforcing member and the lateral beam. In addition, the driving unit is disposed at the corner area between the frame portion and the lateral beam.

Consequently, according to the rear door structure described above, since the driving unit of the wiper device is fixed so as to straddle: the connection portion between the frame portion and the reinforcing member; and the connection portion between the reinforcing member and the lateral beam, it is possible to compactly dispose the driving unit of the wiper device with high rigidity at the corner area between the frame portion and the lateral beam.

It may be arranged such that at least one of the first end side and the second end side of the driving unit is fixed to the reinforcing member.

In this case, since at least one of the first end and the second end of the driving unit is fixed to the reinforcing member, it is possible to enhance the holding strength for holding the driving unit.

It may be arranged such that the first end of the driving unit is fixed in one of a direction parallel to a vehicle exterior panel face of a door panel constituting the rear door and a direction crossing the panel; and the second end of the driving unit is fixed in the other of a direction parallel to the vehicle exterior panel face of the door panel constituting the rear door and a direction crossing the panel.

In this structure, since the fixing directions of the driving unit between the first end and the second end are different from each other, it is possible to solidly bear the reaction force due to an operation of wiper blade that intermittently changes its rotational direction.

Consequently, in this case, since the fixing directions of the driving unit between the first end and the second end are different from each other, it is possible to solidly bear the reaction force due to an operation of wiper blade that intermittently changes its rotational direction, and thereby to suppress the lowering of workability in assembling the driving unit due to dimension error of materials.

It may be arranged such that at least one of the first end side and the second end side of the driving unit is fixed to the respective connection portion with a separate bracket therebetween.

In this structure, it is possible to easily apply the driving unit to a plurality of vehicles of various specifications only by changing the shape or the size of the bracket.

Consequently, in this case, since at least one of the first end side and the second end side of the driving unit is fixed to the respective connection portion with the separate bracket therebetween, it is possible to flexibly apply the driving unit to a plurality kind of vehicles of various specifications without major change in the main body of the rear door. Therefore, it is possible to reduce the production cost.

It may be arranged such that a center portion between the first end side and the second end side of the driving unit is fixed to the reinforcing member.

In this case, since the center portion between the first end side and the second end side of the driving unit is fixed to the reinforcing member, it is possible to further enhance the holding strength for holding the driving unit.

DETAILED DESCRIPTION OF THE INVENTION

An embodiment of the present invention will be explained below with reference to the drawings. In the following explanation, unless otherwise specified, "top", "bottom", "left", and "right" refer to the top, bottom, left, and right with respect to the vehicle body.

Figure 1:
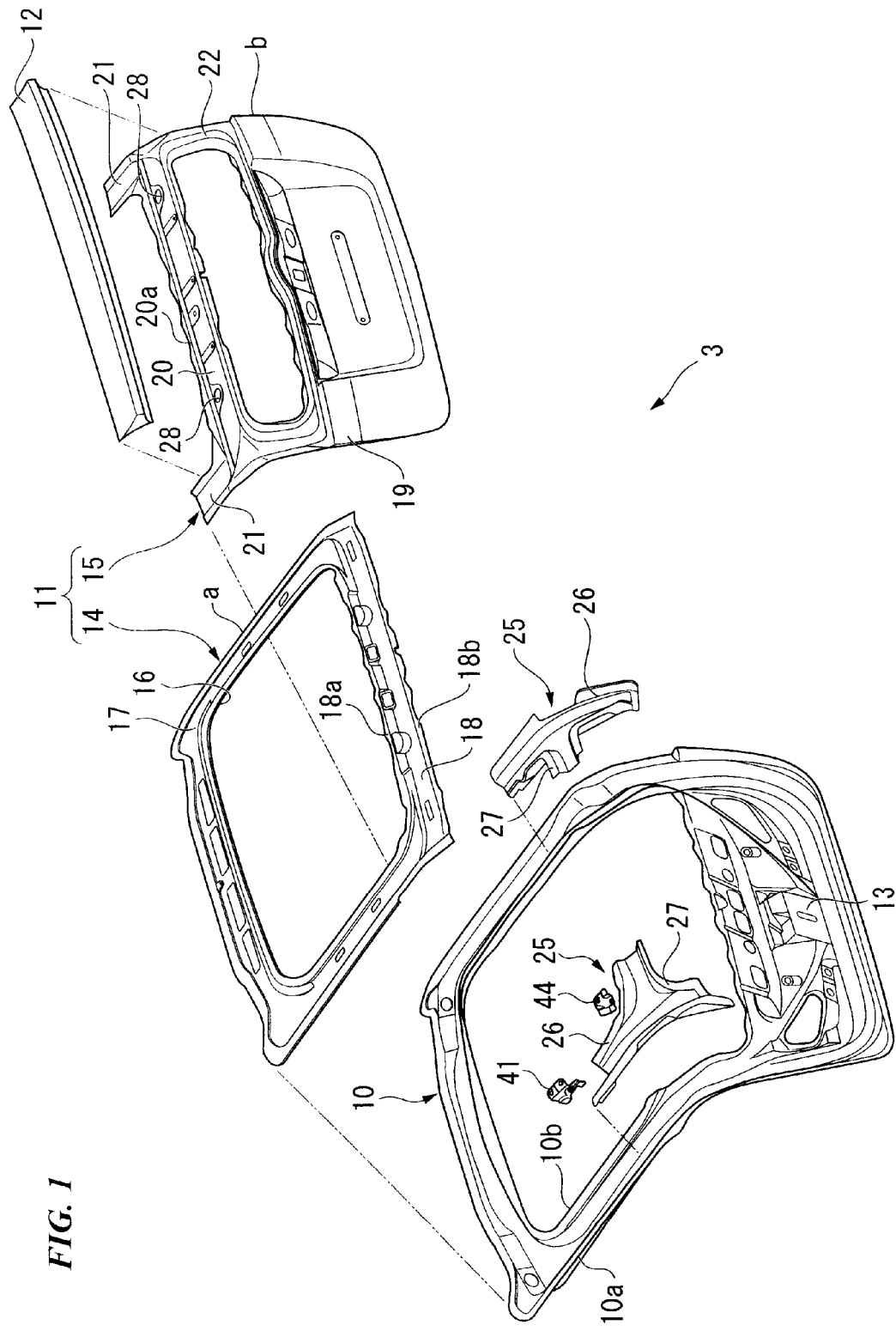
FIG. 1 is an exploded perspective view showing a rear door according to an embodiment of the present invention.

FIG. 1 shows an exploded view showing a rear door 3 of a vehicle.

The rear door 3 is openably and closably provided at an opening in a rear portion of a hatchback type vehicle, in which the upper end of the rear door 3 is supported at the upper edge of the opening with a hinge (not shown in the figures) therebetween so that the rear door 3 can be flipped up. The rear door 3 includes an inclined surface a and a vertical surface b, the inclined surface a, when the rear door 3 closes, inclining backward and downward from a roof of the vehicle body and the vertical surface b, when the rear door 3 closes, extending downward from the rear end of the inclined surface a. A rear glass 5 (refer to cross sections in FIG. 6 to FIG. 8) is placed on the inclined surface a while an extra window glass is placed on the vertical surface b.

The rear door 3 includes: a door frame 10 being one of frame members; a door panel component 11 (door panel) attached to a vehicle exterior side of the door frame 10; and a rear spoiler attached to the vehicle exterior side surface of the door component panel 11. The door frame 10 and the door panel component 11 are made from steel plate material while the rear spoiler 12 is made of resin material.

The door frame 10 is bent in a V shape in a side view so as to form the above-mentioned inclined surface a and the vertical surface b, and formed in substantially a rectangular shape in a front view. The peripheral portion of the door frame 10 is formed in substantially a hat shape opening toward the vehicle exterior side. Further, the outer peripheral edge and the inner peripheral edge of the door frame 10 are provided with a flange portion 10a and 10b, respectively. It should be noted that the reference numeral 13 in the figure denotes an attachment portion provided on the center of the lower edge portion of the door frame 10 for attaching a lock mechanism thereto. In addition, the inner area of the door frame 10 of substantially a rectangular shape opens over the inclined surface a, the vertical surface b, and a bent portion between the inclined surface a and the vertical surface b.

The door panel component 11 includes: an upper door panel 14 constituting the upper half portion of the door panel component 11 and substantially corresponding to the above-mentioned inclined surface a; and a lower door panel 15 constituting the lower half portion of the door panel component 11 and substantially corresponding to the above-mentioned vertical surface b. The upper door panel 14 and the lower door panel 15 are mutually welded and fixed.

Figure 7:
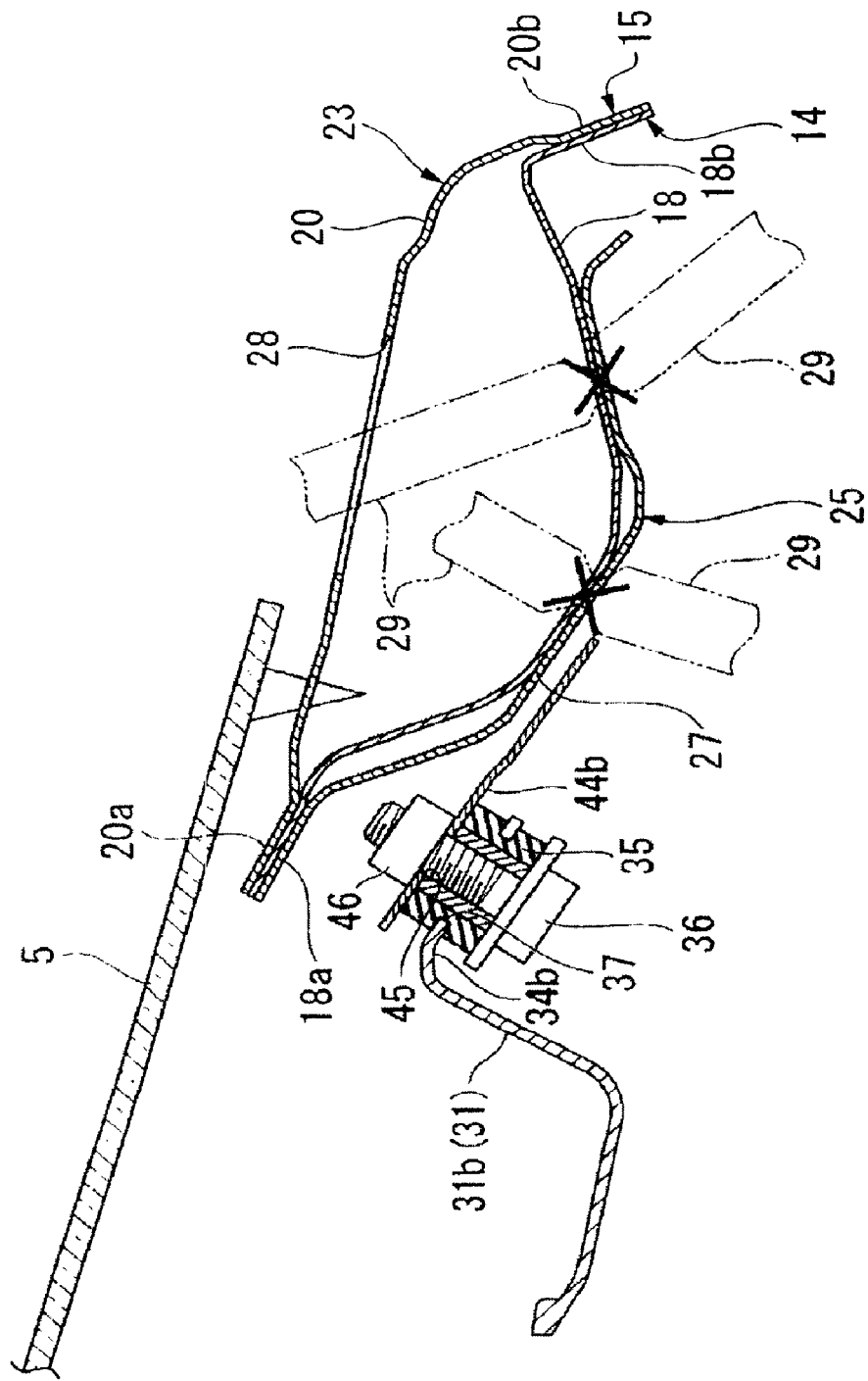
FIG. 7 is a cross sectional view of FIG. 2, taken along the line B-B.
Figure 8:
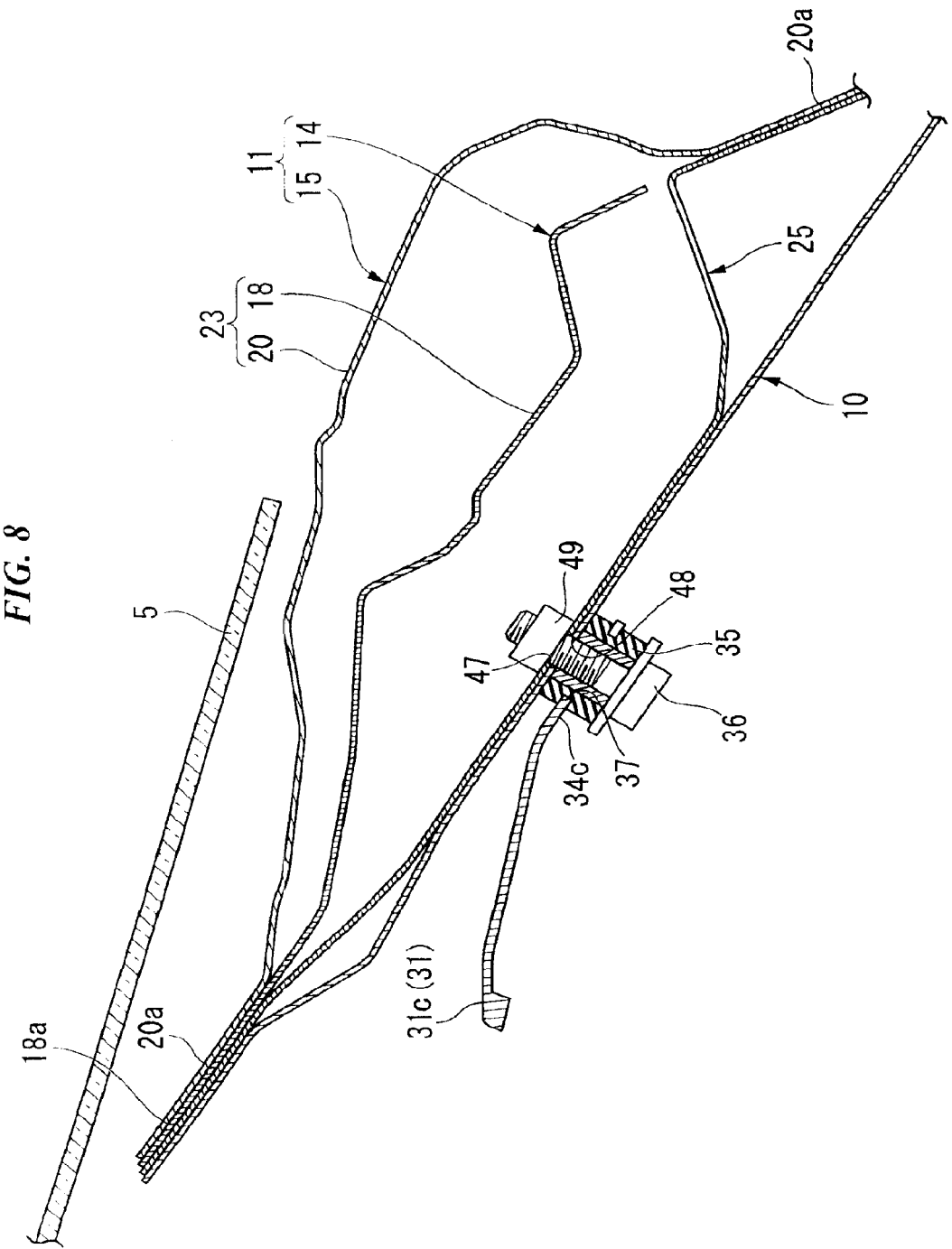
FIG. 8 is a cross sectional view of FIG. 2, taken along the line C-C.

A window opening portion 16 is formed on the inner side of the upper door panel 14. In addition, the upper hem and both lateral side portions of the window opening portion 16 constitutes a frame portion for supporting the upper edge and the lateral edges of the rear glass 5, respectively. Further, as shown in FIG. 7 and FIG. 8, the lower edge of the upper door panel 14 is provided with a lower beam constituent 18 which extends along the vehicle width direction and has a hat-shape cross section with the middle area thereof protruding downward.

On the other hand, the lower door panel 15 is provided with a substantially rectangular-shape panel body 19 constituting the vertical surface b, and the upper edge portion of the panel body 19 is provided with an upper beam constituent 20 which is bent toward the roof of the vehicle body. The upper beam constituent 20 extends along the vehicle width direction and has a hat-shape cross section with the middle area thereof protruding upward as shown in FIG. 7 and FIG. 8. In addition, both edge portions, with respect to the vehicle width direction, of the upper beam constituent 20 are provided with an extending piece 21 which extends obliquely upward along the inclined surface a. Further, a frame portion 22 is provided immediately beneath the upper beam constituent 20 provided on the upper portion of the panel body 19. The extra window glass is to be attached to the frame portion 22.

Figure 2:
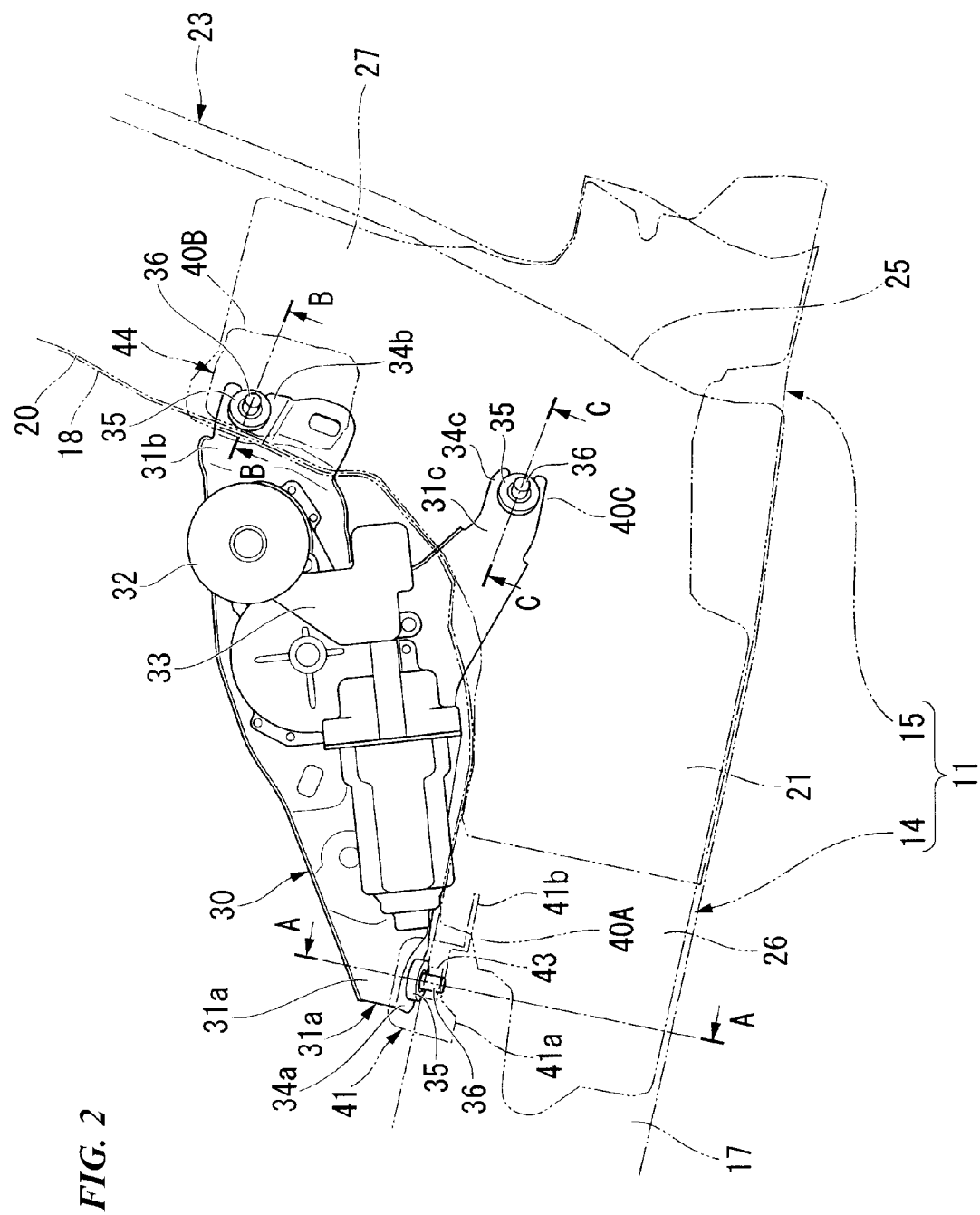
FIG. 2 is a planar view showing an attachment portion of a driving unit according to the embodiment.

FIG. 2 is a schematic view showing a connection portion between the upper door panel 14 and the lower door panel 15 as seen from the vehicle exterior side. The upper beam constituent 20 and both extending pieces 21 of the lower door panel 15 overlap with and are welded to be fixed to the lower edge of the upper door panel 14. Specifically, flange portions 20a and 20b of the upper beam constituent 20 are welded to be fixed to a front flange portion 18a and a back flange portion 18b of the lower beam constituent 18 (refer to FIG. 7 and FIG. 8), respectively. Thereby, the upper beam constituent 20 together with the lower beam constituent 18 forms a lateral beam 23 which has a closed sectional structure and extends in the vehicle width direction. In addition, each edge portion of the upper beam constituent 20 in the vehicle width direction is curved downward to lateral edge portions thereof. The lateral edge portions of the upper beam constituent 20 overlap to the upper surface of the lower beam constituent 18. Each extending piece 21 overlaps and is welded to be fixed to the upper surface at the lower end of a lateral side portion of the frame portion. The lower door panel 15 and the upper door panel 14 are mutually spot welded at a plurality of points, that is, the center and both ends, in the vehicle width direction, of the beam forming regions of the lower door panel 15 and the upper door panel 14, the beam forming regions forming the lateral beam 23

In addition, the rear spoiler 12 made of resin is attached to the upper surface of the lateral beam 23 formed of the lower beam constituent 18 and the upper beam constituent 20.

Further, substantially T-shaped center stiffeners 25, which are reinforcing members, are welded to be fixed to the upper surface of the bent region at both lateral side portions of the door frame 10. The lateral beam 23 of the door panel component 11 is spot welded to be fixed to the door frame 10 via the center stiffeners 25. Each of the center stiffeners 25 includes: a base portion 26 overlapping and fixed to the upper surface of the bent region of the door frame 10; and a support piece 27 extending from substantially the center of the base portion 26 to the vehicle interior in the vehicle width direction. Both lateral edge portions of the lateral beam 23 (lower beam constituent 18) are attached to the upper surface of the support pieces 27. Each of the support pieces 27 is formed to have a cross section that is substantially hat-shaped and has its center in the backwards and forwards direction protruding downward.

The upper beam constituent 20 of the lower door panel 15 is provided with welding work holes 28 that face the respective tips of the support pieces 27 of the center stiffeners 25. When the lateral beam 23 and the center stiffener 25 are welded, the tip of a weld gun 29 is inserted into the welding work hole 28 as shown in FIG. 7. It should be noted that the welding work hole 28 is sealed with a grommet (not shown in the figures) after the welding work.

Figure 6:
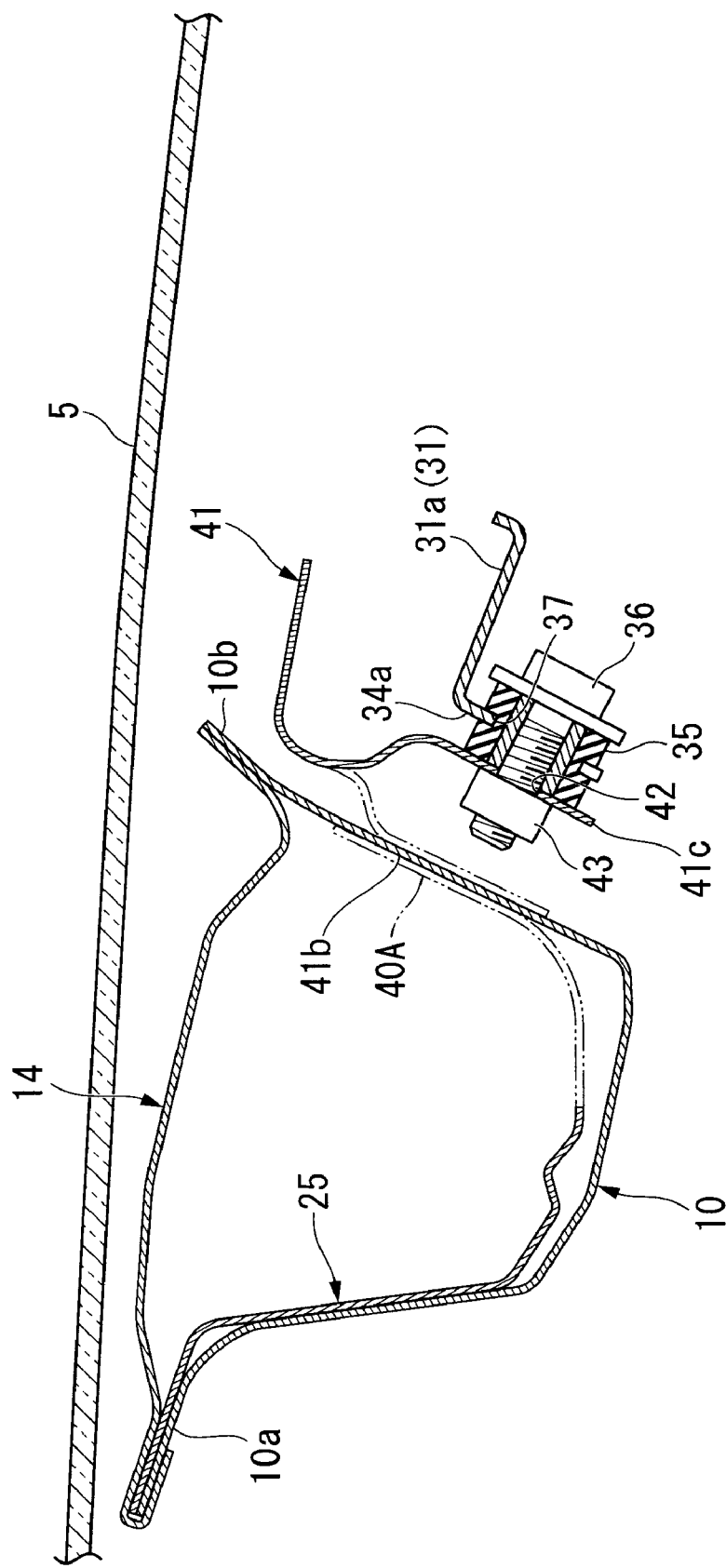
FIG. 6 is a cross sectional view of FIG. 2, taken along the line A-A.

In addition, the outer peripheral edges of the upper door panel 14 and the lower door panel 15 are fixed with the door frame 10 by hemming and welding (refer to FIG. 6). Here, the frame portion of the upper door panel 14 overlaps and is fixed to the frame portion of the door frame 10 to form a frame portion 17 of the rear door 3 having a closed cross section structure.

In the rear door 3 of the present embodiment, a driving unit 30 of a wiper device for wiping the surface of the rear glass 5 is disposed at one of lower corner portions of the frame portion 17 as shown in FIG. 2.

Figure 3:
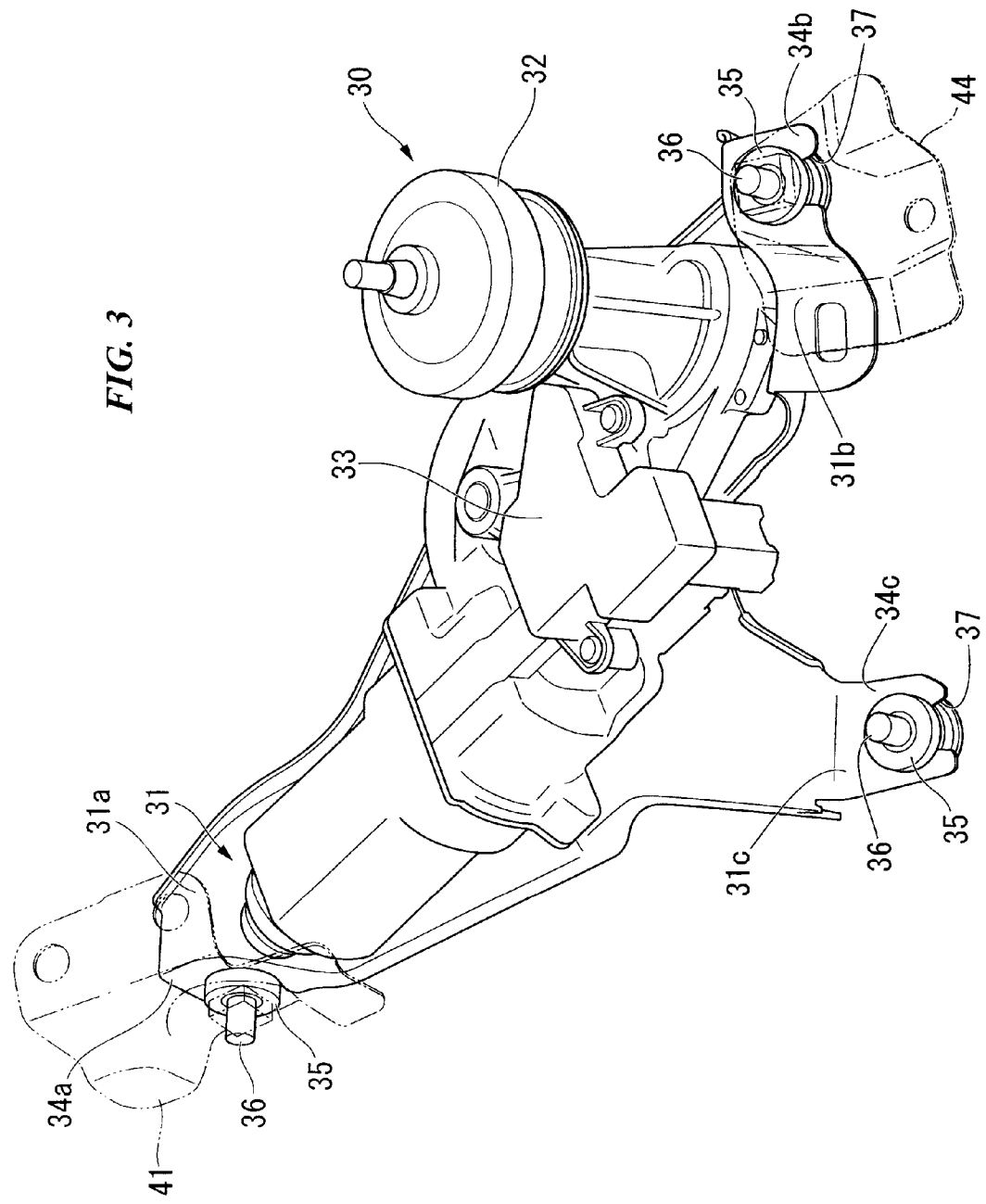
FIG. 3 is a perspective view showing the driving unit according to the embodiment.

The driving unit 30 of the wiper device, as shown in FIG. 2 and FIG. 3, has a substantially Y shaped base bracket 31 to which a motor 32 for driving a blade, a coupler 33 for an electric system, a substrate (not shown in the figures), or the like are mounted. A first end portion 31a of the base bracket 31, corresponding to the base portion of the Y shape, is fixed to a connection portion 40A between a lateral side portion of the frame portion 17 (door frame 10) and the center stiffener 25. Moreover, a second end portion 31b of the base bracket 31, corresponding to one of the bifurcated portions of the Y shape, is fixed to a connection portion 40B between the lateral beam 23 and the center stiffener 25. In addition, a center portion 31c of the base bracket 31, corresponding to the other of the bifurcated portions of the Y shape, is fixed to a connection portion 40 between the door frame 10 and the center stiffener 25, at a position in the heel portion of the lateral beam 23. It should be noted that the center of gravity of the driving unit 30 of the wiper device is designed to be inside a triangle formed by lines connecting between the first end portion 31a, the second end portion 31b, and the center portion 31c that are fixation portion of the base bracket 31.

More specifically, the first end portion 31a of the base bracket 31 is provided with a fixation piece 34a which is bent at substantially a right angle toward the lateral side portion of the frame portion 17 of the door frame 10. On the fixation piece 34a, a slit 37 (refer to FIG. 6) is forged that engages with a bolt 36 via a rubber mount 35. The fixation piece 34a of the first end portion 31a faces the lateral face of the frame portion 17 at the vehicle interior side, and the bolt 36 engaging the fixation piece 34a is fastened in a direction substantially along the vehicle width direction.

The second end portion 31b and the center portion 31c of the base bracket 31 are provided with fixation pieces 34b and 34c, respectively, the fixation pieces 34b and 34c facing the lower face of the lateral beam 23. On each of the fixation pieces 34b and 34c, there is formed a slit 37 (refer to FIG. 7 and FIG. 8) that engages with a bolt 36 via a rubber mount 35. The bolts 36 engaging the fixation pieces 34b and 34c of the second end portion 31b and the center portion 31c are fastened in a direction substantially along the vertical direction. The fastening directions between the bolt 36 at the first end portion 31a and the bolts 36 at the second end portion 31b and the center portion 31c are perpendicular to each other. In addition, the slit 37 at the first end portion 31a and the slits 37 at the second end portion 31b and the center portion 31c are formed so as to be perpendicular to each other, the slits 37 guiding the respective bolts 36.

Figure 4:
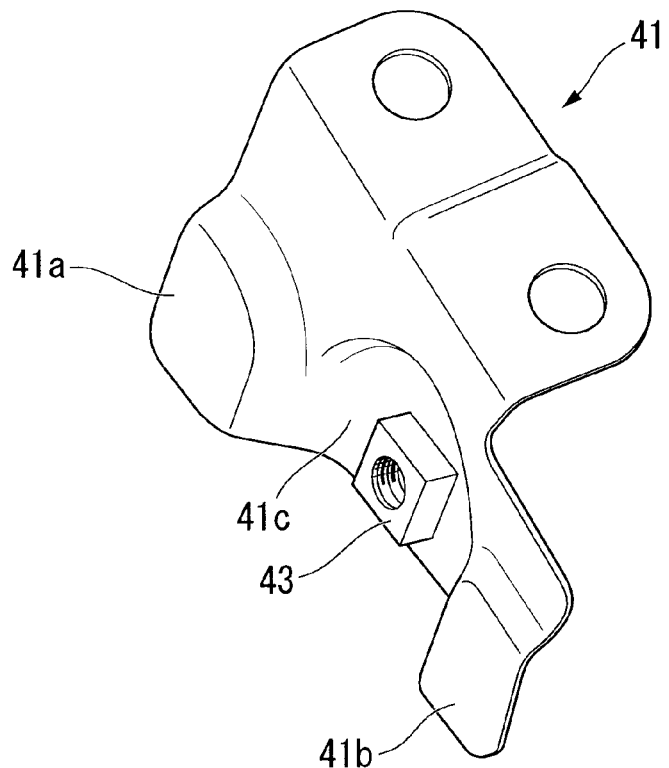
FIG. 4 is a perspective view showing a first auxiliary bracket according to the embodiment.

On the other hand, a first auxiliary bracket 41 (separate bracket) is welded and fixed to a position on the door frame 10 (inner face of the lateral side portion of the frame portion 17), to which the fixation piece 34a of the first end portion 31a of the base bracket 31 is attached. The first auxiliary bracket 41 also serves as a reinforcing member. The first auxiliary bracket 41 has, as shown in FIG. 4, a pair of fixation walls 41a and 41b that are welded to the lateral face of the frame portion 17 and a bent wall 41c that is provided between the fixation walls 41a and 41b and projects toward the vehicle interior side in the vehicle width direction. The bent wall 41c is provided with a bolt insertion hole 42 (refer to FIG. 6) and a weld nut 43. The fixation wall 41a is welded to the vicinity of the connection portion 40A between the door frame 10 and the center stiffener 25, while the fixation wall 41b overlaps and is welded to the connection portion 40A between the door frame 10 and the center stiffener 25. The bolt 36 engaging the first end portion 31a of the base bracket 31 is fastened to the weld nut 43 through the boll insertion hole 42.

Moreover, a second auxiliary bracket 44 (separate bracket) is welded and fixed to the lower face of the support piece 27 of the center stiffener 25, to which the fixation piece 34b of the second end portion 31b of the base bracket 31 is attached. The second auxiliary bracket 44 also serves as a reinforcing member.

Figure 5:
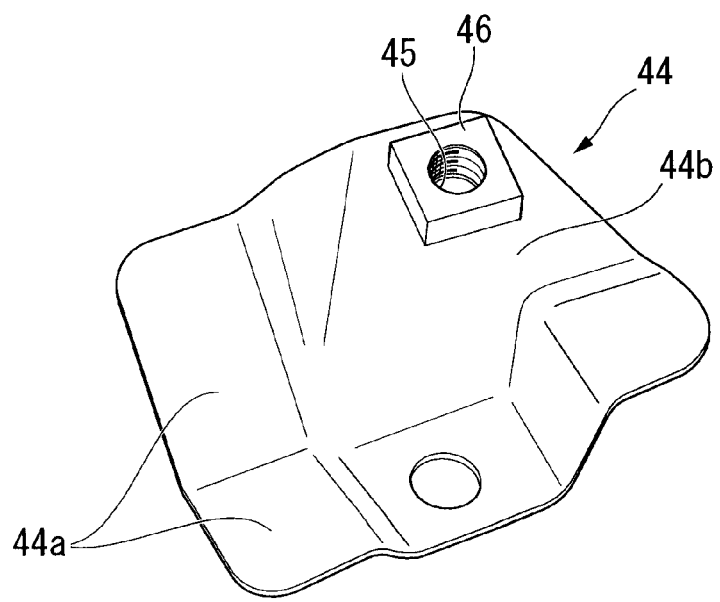
FIG. 5 is a perspective view showing a second auxiliary bracket according to the embodiment.

The second auxiliary bracket 44 has, as shown in FIG. 5, a fixation wall 44a which is welded and fixed to the lower face of the support piece 27 of the center stiffener 25 and an extending wall 44b that extends from the fixation wall 44a. The extending wall 44b is provided with a bolt insertion hole 45 (refer to FIG. 7) and a weld nut 46. The fixation wall 44a overlaps and is welded to the connection portion 40B between the center stiffener 25 and the lower beam constituent 18. The bolt 36 engaging the second end portion 31b of the base bracket 31 is fastened to the weld nut 46 through the bolt insertion hole 45.

In the overlap portion of the center stiffener 25 and the door frame 10 at the heel portion of the lateral beam 23, bolt insertion holes 47 and 48 are respectively formed, as shown in FIG. 8. In addition, a weld nut 49 is provided on the upper face of the center stiffener 25. The bolt 36 engaging the center portion 31c of the base bracket 31 is fastened to the weld nut 46 through the bolt insertion holes 47 and 48.

As has been described above, in the rear door 3 of the vehicle 1 of the present embodiment, the driving unit 30 of the wiper device is disposed on one of a lower corner of the frame portion 17, the first end portion 31a is fixed to the connection portion 40A between the frame portion 17 and the center stiffener 25, and the second end portion 31b is fixed to the connection portion 40B between the center stiffener 25 and the lateral beam 23. Therefore, it is possible to compactly dispose the driving unit 30 with high rigidity at the corner area between the frame portion 17 and the center stiffener 25.

In particular, in the present embodiment, since the center portion 31c of the driving unit 30 is also fixed to the connection portion 40C between the center stiffener 25 and the door frame 10, it is possible to enhance the holding strength for holding the driving unit 30.

In this rear door 3, since the end portions 31a and 31b and the center portion 31c of the driving unit 30 are fixed to the center stiffener 25 having high rigidity and high mechanical strength, it is advantageous in enhancing the holding strength for holding the driving unit 30.

Moreover, in the rear door 3, the fastening directions between at the first end portion 31a and at the second end portion 31*b* are designed to be substantially perpendicular to each other. Therefore, it is possible, with high mechanical strength, to reliably bear the reaction force due to an operation of wiper blade that intermittently changes its rotational direction by a plurality of bolts 36 having a different fastening direction from each other. Further, since the fastening directions between at the first end portion 31*a* and at the second end portion 31*b* are designed to be substantially perpendicular to each other, if there are some dimension errors in component materials, it is possible to overcome such errors by sliding the bolt 36 in the slit 37 and adjusting the degree of which the bolt 36 is fastened. Therefore, it is possible to suppress the lowering of workability in assembling the driving unit 30.

Further, in the present embodiment, the separate first auxiliary bracket 41 and the second auxiliary bracket 44 are attached to the lateral face of the frame portion 17 of the door frame 10 and the lower face of the support piece 27 of the center stiffener 25, respectively. In addition, the first end portion 31*a* of the driving unit 30 is fixed to the connection portion 40A via the bracket 41, and the second end portion 31*b* is fixed to the connection portion 40B via the bracket 44. Therefore, it is possible to flexibly apply the driving unit 30 to many types of vehicles of various specifications only by changing the brackets 41 and 44, without major change in the door frame 10 or the door panel component 11 of the rear door 3.

It should be noted that the present invention is not limited to the embodiment described above. Various design modifications may be made without departing from the spirit or scope of the present invention.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A rear door structure in which a rear door is openably and closably provided on a rear portion of a vehicle body, the rear door structure comprising:
    a frame portion having lateral side portions, the frame portion supporting an upper edge and both lateral edges of a rear glass;
    a lateral beam which extends in a vehicle width direction and connects both of the lateral side portions of the frame portion to each other;
    a reinforcing member which straddles the lateral side portion of the frame portion and the lateral beam; and
    a driving unit for a wiper device disposed at the intersection of one lateral side portion of the frame portion and the lateral beam to wipe a surface of the rear glass, wherein
    a first end side of the driving unit is fixed to a first connection portion at which one of the lateral side portions of the frame portion and the reinforcing member are connected; and
    a second end side of the driving unit is fixed to a second connection portion at which the reinforcing member and the lateral beam are connected.

2. The rear door structure according to claim 1, wherein at least one of the first end side and the second end side of the driving unit is fixed to the reinforcing member.

3. The rear door structure according to claim 1, wherein:
    the first end side of the driving unit is fixed in one of a direction parallel to a vehicle exterior panel face of a door panel constituting the rear door and a direction crossing the panel; and
    the second end side of the driving unit is fixed in the other of a direction parallel to the vehicle exterior panel face of the door panel constituting the rear door and a direction crossing the panel.

4. The rear door structure according to any one of claim 1, wherein at least one of the first end side and the second end side of the driving unit is fixed to the first connection portion and the second connection portion respectively with a separate bracket therebetween.

5. The rear door structure according to any one of claim 1, wherein a center portion between the first end side and the second end side of the driving unit is fixed to the reinforcing member.

\* \* \* \* \*